Aug. 24, 1954   C. G. ULLIN   2,686,928
MACHINE FOR TENDERLOINING FISH
Filed May 5, 1950   4 Sheets-Sheet 1

INVENTOR.
Carl G. Ullin

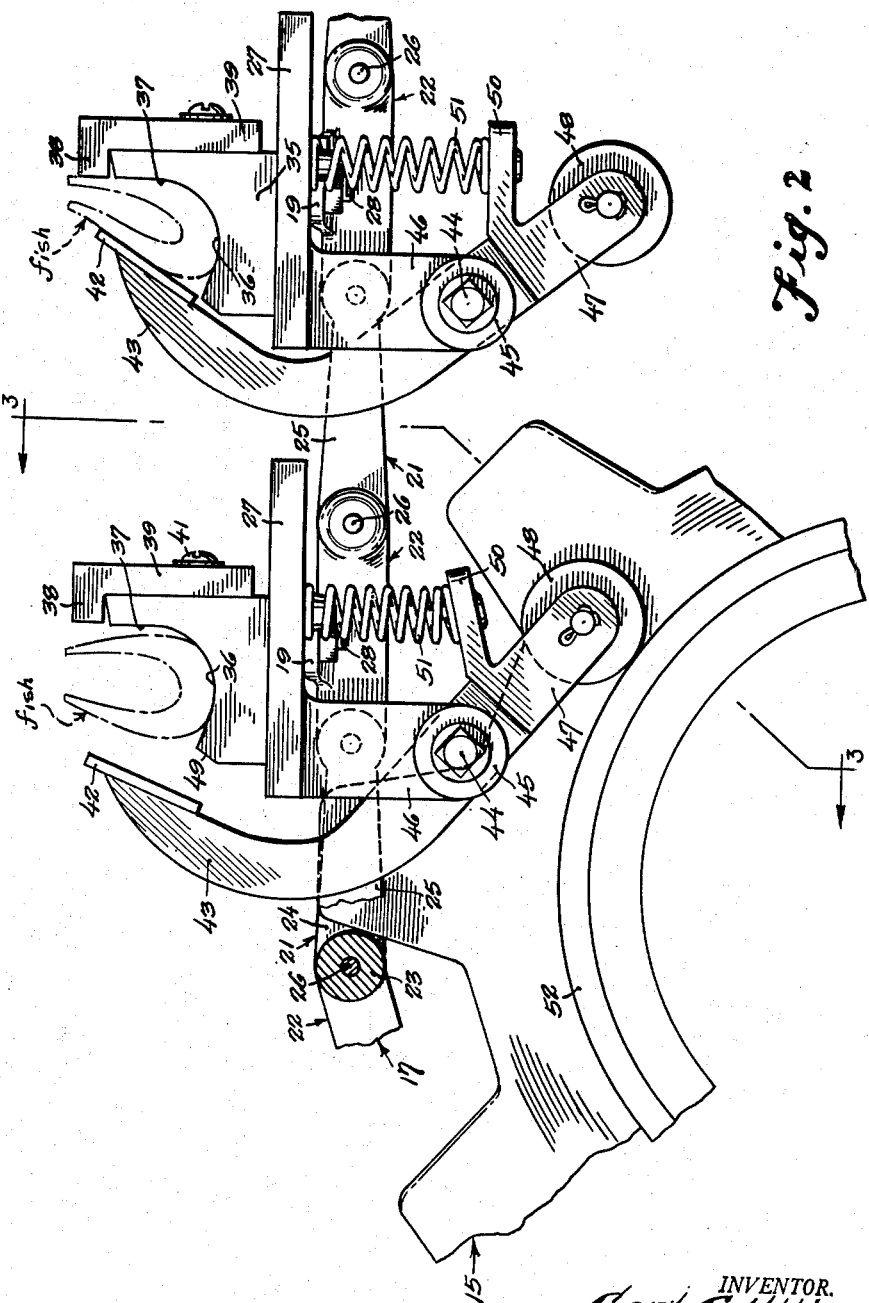

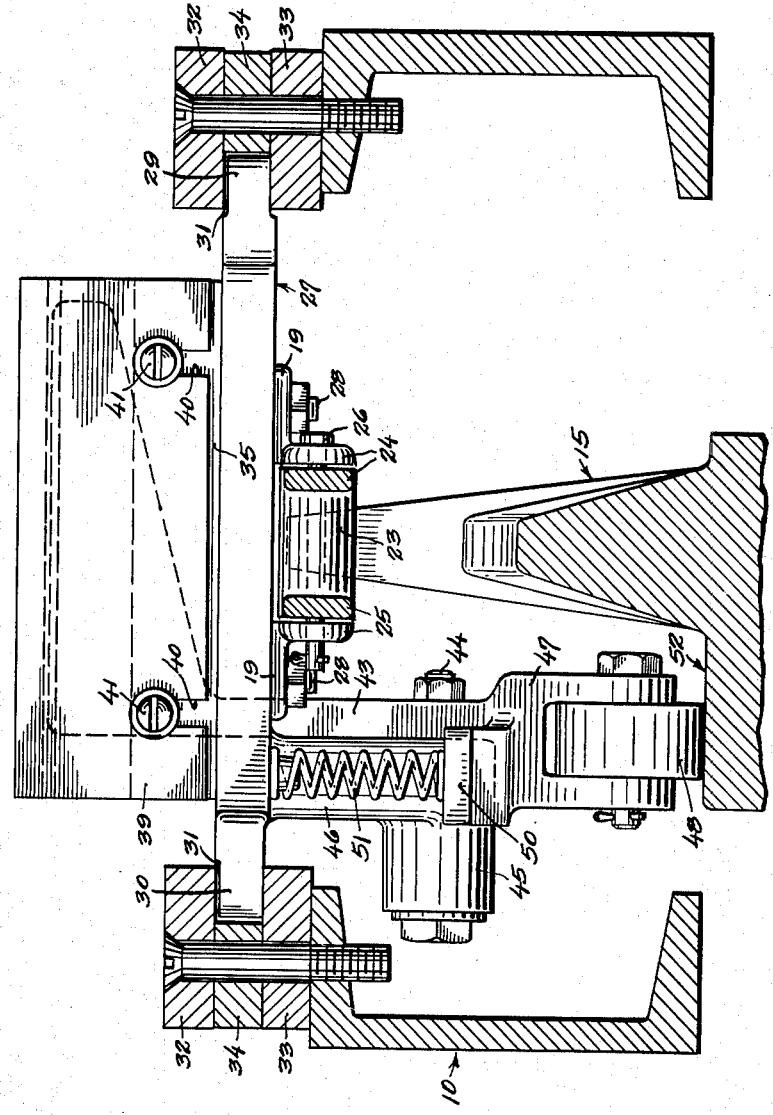

Aug. 24, 1954    C. G. ULLIN    2,686,928
MACHINE FOR TENDERLOINING FISH
Filed May 5, 1950    4 Sheets-Sheet 4

INVENTOR.
Carl G. Ullin
BY
atty.

Patented Aug. 24, 1954

2,686,928

UNITED STATES PATENT OFFICE 2,686,928

MACHINE FOR TENDERLOINING FISH

Carl G. Ullin, Seattle, Wash.

Application May 5, 1950, Serial No. 160,135

6 Claims. (Cl. 17—4)

This invention relates to means and method for tenderloining herring or other like fish to put the same in condition for canning, and namely such a means and method as will produce from each individual fish a cleaned single chunk of meat devoid of entrails and with the head and tail removed.

The invention broadly aims to provide an improved machine and method for this purpose in which the fish to be processed are carried by an endless conveyor through successive stages of their necessary treatment, and as a more particular and ancillary object aims to devise a perfected endless chain serving as the conveying instrumentality.

These and other objects and advantages in view will appear and be understood in the course of the following description and claims, the invention consisting in the method and in the novel construction, adaptation and combination of the parts of the machine, hereinafter described and claimed.

In the accompanying drawings:

Fig. 2 is an enlarged-scale fragmentary side elevational view portraying the conveyor chain in detail.

Fig. 3 is a transverse vertical sectional view on broken line 3—3 of Fig. 2.

Figure 1:
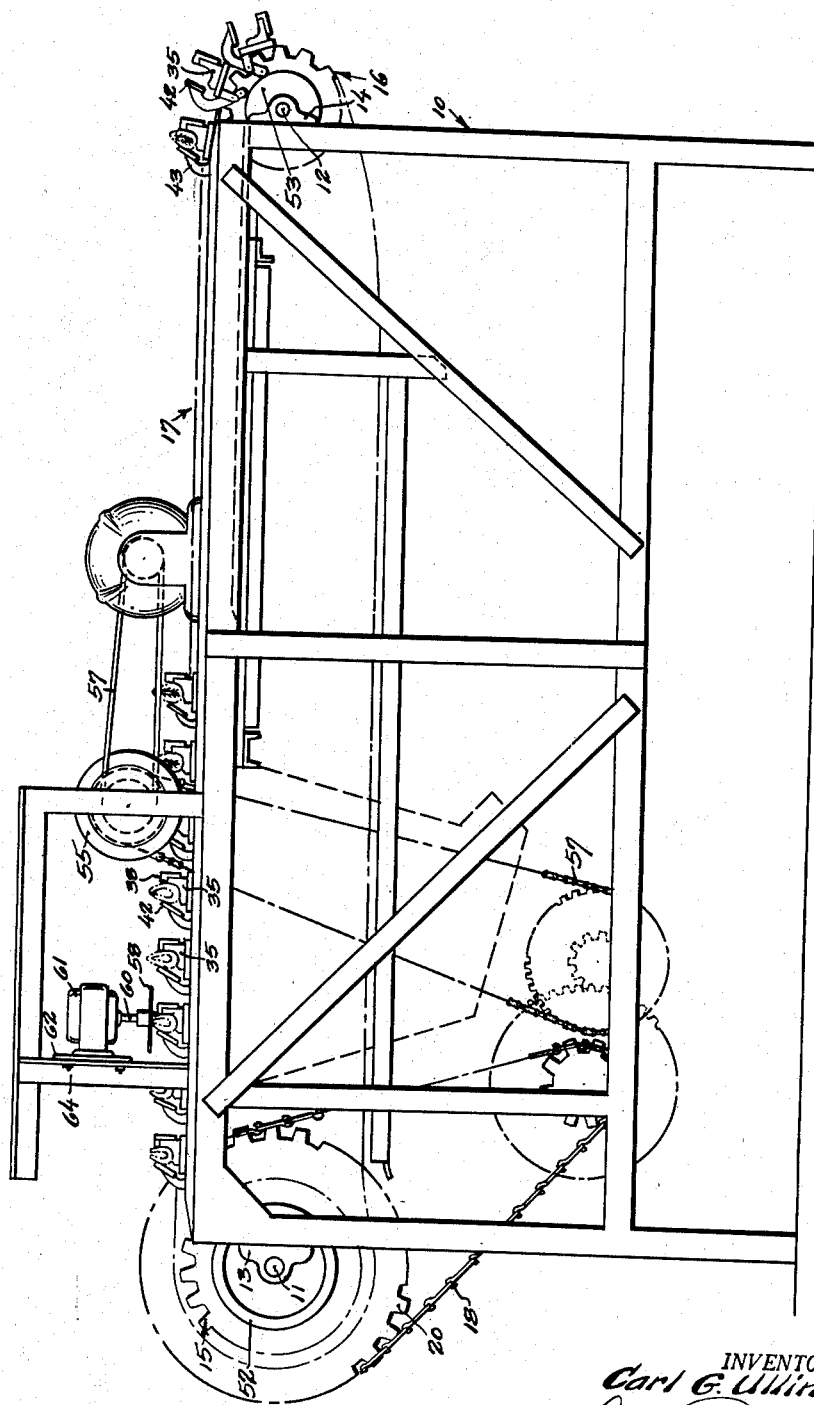
Figure 1 is a somewhat schematic side elevational view of a machine constructed in accordance with the preferred teachings of the present invention. For simplicity in illustration water-jet nozzles employed with the machine and portrayed in a separate view are deleted from this figure.
Figure 5:
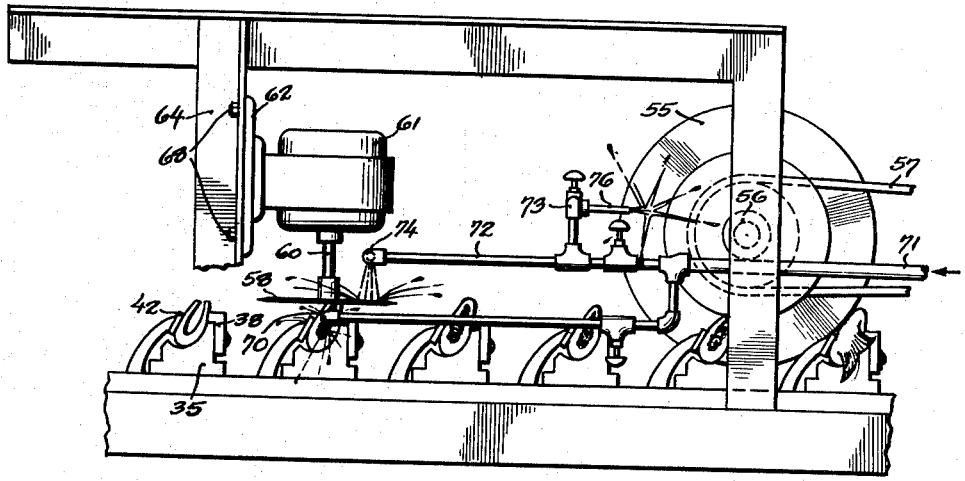
Fig. 5 is a fragmentary side elevational view of the machine portraying the cutter knives and the associated water-jet nozzles.
Figure 7:
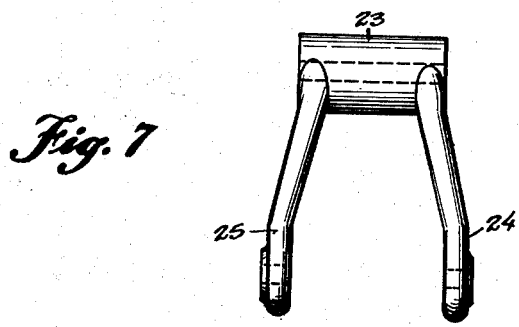
Fig. 7 is a top plan view of a single link of the conveyor chain proper.
Figures 4, 6:
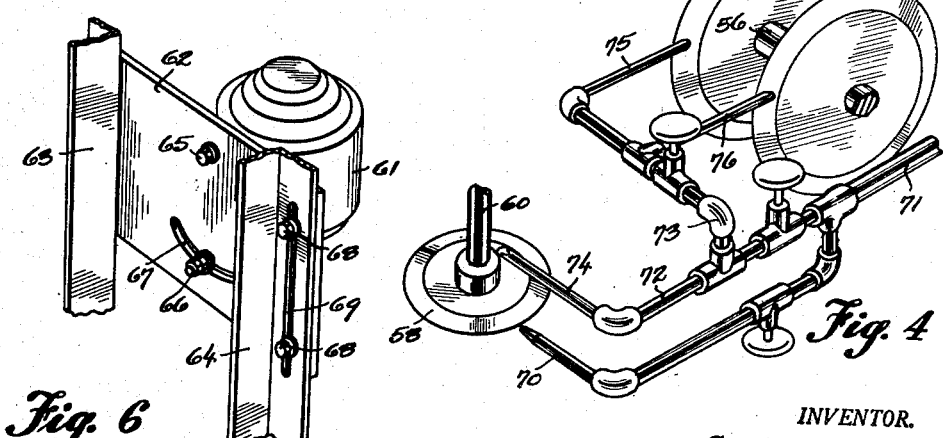
Fig. 4 is a fragmentary perspective view illustrating the cutter knives and the associated water-jet nozzles.
Fig. 6 is a fragmentary perspective view illustrating the horizontal cutter shown in Fig. 4.

Before proceeding with a detailed description of the present invention it may be here stated that the same bears some similarities to my previous U. S. Pat. No. 2,105,207, issued January 11, 1938, and also to U. S. Pat. No. 2,086,070, issued to Alton L. Dunn July 6, 1937. The end object of the present invention is, in fact, much the same as that of Dunn, and namely to obtain from herring and other like fish a solid chunk of meat containing dorsal and flank sections, commonly termed the "tenderloin" portion of the fish, and with the visceral matter removed.

According to the present invention there is provided a suitable framework indicated generally by the numeral 10. At the front and rear ends of this framework are driver and idler axles 11 and 12 journal-mounted in frame-carried bearings, as 13 and 14, for rotary movement about transverse horizontal axes, and made fast to these axles to lie in a common longitudinal vertical plane centered as respects the width of the frame are respective sprocket wheels 15 and 16. An endless conveyor chain, designated generally by 17, is trained about these sprocket wheels. The drive to the driver axle is obtained by a power-driven chain 18 passing about a sprocket wheel 20 fast to an exposed end extremity of the driver axle.

The conveyor chain is composed of a plurality of alternately applied furcate links 21 and 22 providing, in each instance, a transversely bored crossarm 23 and fork-arms 24 and 25 which terminate in coaxially bored bosses. The fork-arms diverge in a degree sufficient to enable the bossed free ends of one link to lap the crossarm of a next following link, and extending through the registering bores of these lapped ends are respective pivot pins 26. The teeth of the sprocket wheels 15 and 16 lie in a vertical plane coinciding with the approximate longitudinal median line of the chain links and as the chain passes about the sprocket wheel the teeth of the latter enter mating pockets in the chain, these pockets being defined along the sides by the fork-arms 24—25 and along the ends by the cross-arms of successive links. The spacing of the teeth is such that successive teeth enter alternate such pockets.

The links of the chain which lie between these tooth-gripping carrier links each serves as the support for a respective fish-gripping carrier device, hereinafter termed a bucket, and to produce a mounting for such buckets. Each fork-arm of the supporting links has an out-jutting horizontal lug 19 which is made an integral part of the link. The buckets each include a flat bed-plate 27 which seats upon and is secured by bolts 28 or the like to the lugs. In order that the buckets will move along a predetermined path as they are carried with the conveyor chain in the upper-run travel of the latter, said bed-plates project laterally as tongue prolongations beyond each side edge of the chain, and these tongues, designated by 29 and 30, are journaled for slide movement in horizontal guide channels 31 defined between upper and lower rails 32 and 33 which, with intervening spacer-bars 34, are bolted to the frame.

Each of the buckets serves as the carrier for an individual fish, and to perform this office the buckets provide complementary fish-gripping jaws one of which is movable and the other of which is stationary relative to the bucket. The stationary jaw comprises a block body 35 rigidly sustained upon the bed-plate to extend transversely of the latter, and has a length approximating that part of the fish which constitutes the "tenderloin." Viewed in side elevation this block suggests a chair structure in that there is presented a re-entrant arcuate throat open to the front and to the top to produce a seat wall 36 and a back wall 37. The back wall of the seat is made adjustable for height and to such end the block carries an L-shaped bar one leg 38 of which lies in surmounting relation to the back wall and the other leg 39 of which overlies the rear face of the block, slots 40 cut in said leg 39 accommodating clamping screws 41 for localizing the bar in selected vertically adjusted positions.

The movable jaw comprises a transversely extending plate 42, and derives its support from the working arm 43 of a lever fulcrumed upon a pin 44 for rocker movement about a transverse horizontal axis. The pin takes its bearing in a boss 45 formed upon the lower end of a pendant hanger arm 46 made an integral part of the bed-plate. The lever is of the first order, and which is to say that its fulcrum lies intermediate the ends and the power arm 47 extends on a sloping plane downwardly and rearwardly from the fulcrum, being formed upon its rear extremity with a fork in which there is journaled a roller 48. Also formed upon this power arm and extending rearwardly therefrom is an ear 50, and bearing by one of its ends upon this ear and by its other end against the underside of the bed-plate is a coil spring 51. The action of the spring is thus one of urging the roller-carrying lever arm 47 downwardly, and namely directively from the bed-plate, consequently acting to urge the working arm 43 in an opposite direction to cause the opposing jaws to normally occupy a closed, or relatively closed, position. A stop-shoulder 49 limits the closing movement.

In order that the several jaw-sets may be forcefully opened in opposition to the pressure of the respective spring, and which is performed upon successive buckets at two separated intervals during each cycle of the conveyor chain's endless travel, there is integrated with each of the two sprocket wheels 15 and 16 a respective drum, as 52 and 53, presenting a flat rim which is concentric to the supporting axle. These rims lie in an interruptive position in the path travelled by the rollers 48 and act to raise the latter in opposition to the imposed thrust of the springs in a degree sufficient to accomplish a substantial opening of the jaws. There is also provided a plate or the like 59, shown by the dotted lines in Fig. 1, which extends longitudinally of the machine from the sprocket wheel 16 on a horizontal plane tangent to the upper level of the rim 53, running for approximately half the length of the machine.

Considered relative to the upper-run travel of the conveyor chain, the idler sprocket wheel lies at the head end and the driver sprocket wheel at the tail end of the machine, and as the rollers 48 track about the rim 53 and travel along the length of the plate 59 the jaws are held open and an operator stationed at the head end of the machine deposits an individual fish between the open jaws of each successive bucket, the head and tail portions of the fish projecting from opposite sides beyond the side-edge limits of the bucket proper. Leaving the sprocket wheel and proceeding along their guided upper-run path, the movable jaw closes by force of spring pressure upon the deposited fish and firmly grips the same. It is in course of this guided upper-run travel that I successively subject the gripped fish first to the action of edge cutters and then to the action of a belly cutter. The edge cutters comprise a pair of vertical transversely spaced circular knives 54 and 55 fixedly carried upon a cross-shaft 56 driven by a belt or chain 57 from any suitable source of power, and the belly cutter comprises a single horizontal circular knife 58 fixedly carried upon the arbor 60 of an electric motor 61. The knives 54 and 55 are adjustable axially in compensation of different sizes of fish. The knife 58 is swingably adjustable, having its motor pivotally hung from a cross-plate 62 which is in turn adjustable vertically in two frame-carried standards 63 and 64. The said swing adjustment comprises two nutted bolts 65 and 66 of which the latter works in an arcuate slot 67 about the center of the former as a pivot, and the vertical adjustment comprises nutted bolts 68 working in rectilineal slots 69. The location of the horizontal knife is determined by the size and shape of the particular run of fish which are being processed, and is set to cut only so much of a belly strip as is necessary to expose the entrail cavity, and this is to say that the knife and its drive motor are bodily raised for larger fish and lowered for smaller fish. Normally the knife will be set to occupy a substantial horizontal plane but in those instances where a thick-bellied run of fish are being handled it sometimes becomes desirable to cut the bellies on a sloping plane and for these runs the knife is tilted somewhat from the horizontal. The significance of the height adjustment given to the back-wall of the stationary jaws can now be pointed out, the purpose being to maintain only bare clearance at all times between the horizontal knife and the top-most limit of the bucket's fish-sustaining back-wall and thus preventing a roll edge from occurring as the knife performs its cutting function upon the belly.

Arranged to complement the horizontal cutting knife the invention provides a means by which the severed belly strip and the entrails may be flushed away from the conveyed fish, and the means which I employ for this purpose is comprised of one or more water nozzles 70 located below and to one side of the knife in a substantial transverse vertical plane traversing the rotary axis of the latter and placed to project the delivered jet through the belly cavity of the conveyed fish. Water under pressure is fed from a supply pipe 71 to this nozzle. Branches 72 and 73 feed water from this supply pipe to additional nozzles, as 74, 75 and 76, which operate to maintain the knives free of any slime or other foreign matter picked up from the fish. As the fish proceed beyond the knives and pass with the buckets over the tail sprocket wheel 15 the jaws open and deposit the fish upon a belt or other like lower-level conveyor by which they are carried to a canning station.

It is thought that the machine and method of the present invention will have been clearly understood from the foregoing description.

Changes in the details of construction will occur to those versed in the art and it is accordingly my intention that no limitations be implied and that the hereto annexed claims be given a scope fully commensurate with the broadest interpretation to which the employed language fairly admits.

What I claim is:

1. A fish tenderloining machine comprising means for gripping a fish with the belly exposed and having the head and tail removed, means associated with said gripping means for conveying the fish-gripping means and the fish gripped thereby along a given travel path, cutting means associated with said conveying means to sever a strip from the exposed belly, and means associated with said conveying means for dislodging the severed belly strip together with the fish entrails.

2. Structure according to claim 1 in which the means for conveying is an endless conveyor, the fish-gripping means being in the nature of a bucket and comprising a bed-plate attached to the conveyor, a block rigidly sustained upon the bed-plate to serve as a stationary jaw and formed with a re-entrant arcuate throat open to the front, top, and sides, a lever fulcrumed intermediate its ends to the bed-plate for pivotal movement about a transverse horizontal axis with the power arm lying below the bed-plate and sloping downwardly and rearwardly from the pivotal axis and with the working arm projecting above the bed-plate and occupying a position to the front of the block, a transversely extending jaw fixedly carried by said working arm and functioning as the movable complement of said stationary jaw, a surmounting vertically adjustable head-piece for the block, a spring acting upon the power arm of said lever for urging the movable jaw toward the stationary jaw, and means acting upon the power arm counter to the force of the spring and made to operate at two separated points within the travel path of the conveyed bucket for momentarily retracting said movable jaw.

3. A fish tenderloining machine comprising means for gripping a fish with the belly exposed and having the head and tail removed, means associated with said gripping means for conveying the fish-gripping means and the fish gripped thereby along a given travel path, a circular knife associated with said conveying means mounted to sever a strip from the exposed belly, and means associated with said conveying means for dislodging the severed belly strip together with the fish entrails, said dislodging means comprising a pressure jet of fluid directed longitudinally through the belly cavity of the fish.

4. A fish tenderloining machine comprising means for gripping the fish with the belly exposed and having the head and tail removed, a circular knife operatively associated with said gripping means mounted to sever a strip from the exposed belly, said circular knife being swingably adjustable, the fish-gripping means comprising complementary opposed jaws lying to the front and rear of the gripped fish with the rear jaw producing a backing support for the flank section of the fish as the circular knife performs its belly-cutting function, means being provided for adjusting the height of said backing support for compensating the same to adjustments given to the knife, means associated with said conveyor for dislodging the severed belly strip together with the fish entrails, and means for conveying the fish-gripping means and the fish gripped thereby to the circular knife and the dislodging means.

5. In a fish tenderloining machine, in combination: an endless conveyor being positioned on a given travel path, a bucket carried by said conveyor and comprising complementary stationary and movable jaws of which the former presents a seat for a fish so supporting the latter as to cause the fish to lie transverse to said path travelled by the buckets and of which the latter presses against the seated fish to hold the same securely upon said seat, said jaws being characterized in that the same expose the head, the tail, and the belly of the fish, cutters localized along said travel path of the conveyed fish in positions whereat the same act upon the conveyed fish to sever said exposed portions of the fish from the body proper of the latter as the bucket-carried fish moves with the conveyor, and means also occupying a position along said travel path of the conveyed fish and acting upon the bucket-carried fish as it moves with the conveyor to dislodge the severed belly part of the fish together with the fish entrails.

6. Structure according to claim 5 in which the cutters act to sever the exposed tail and head parts of the fish before the exposed belly part is severed, and wherein said dislodging means comprises a pressure jet of fluid directed longitudinally through the belly cavity of the conveyed fish.

References Cited in the file of this patent

UNITED STATES PATENTS

| Number | Name | Date |
|---|---|---|
| 541,458 | Schroeder | June 25, 1895 |
| 934,890 | Davidson | Sept. 21, 1909 |
| 1,057,636 | Grauer | Apr. 1, 1913 |
| 1,071,925 | Keith | Sept. 2, 1913 |
| 1,873,604 | Kugler | Aug. 23, 1932 |
| 2,086,070 | Dunn | July 6, 1937 |
| 2,239,013 | Palmer et al. | Apr. 22, 1941 |
| 2,245,329 | Danielsson | June 10, 1941 |
| 2,311,176 | Hutton | Feb. 16, 1943 |